March 15, 1966  A. J. GRINER  3,240,314
CONVEYOR LINE ARRANGEMENT
Filed May 19, 1964  8 Sheets-Sheet 1
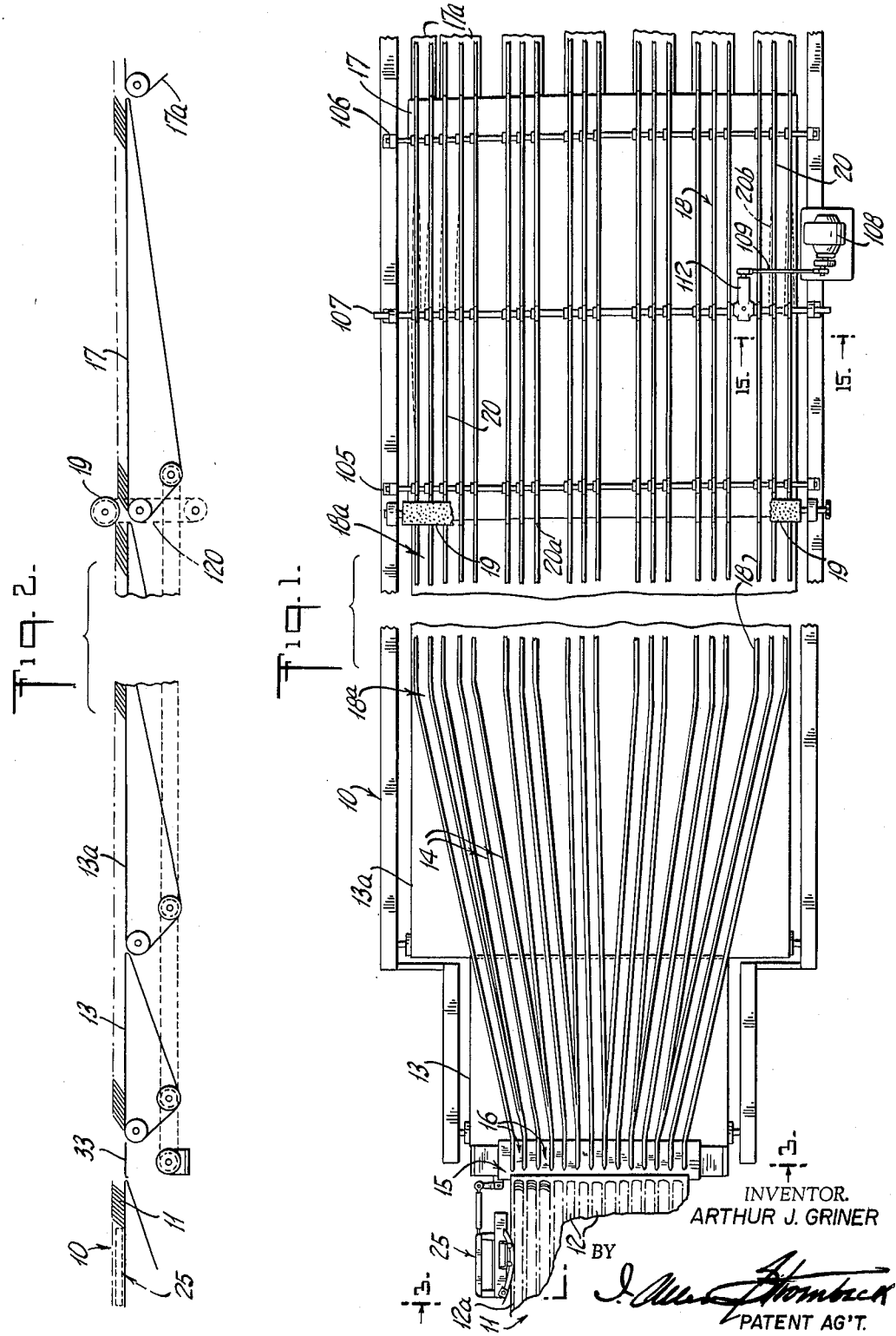
INVENTOR.
ARTHUR J. GRINER
BY
PATENT AG'T.

March 15, 1966  A. J. GRINER  3,240,314
CONVEYOR LINE ARRANGEMENT
Filed May 19, 1964  8 Sheets-Sheet 2
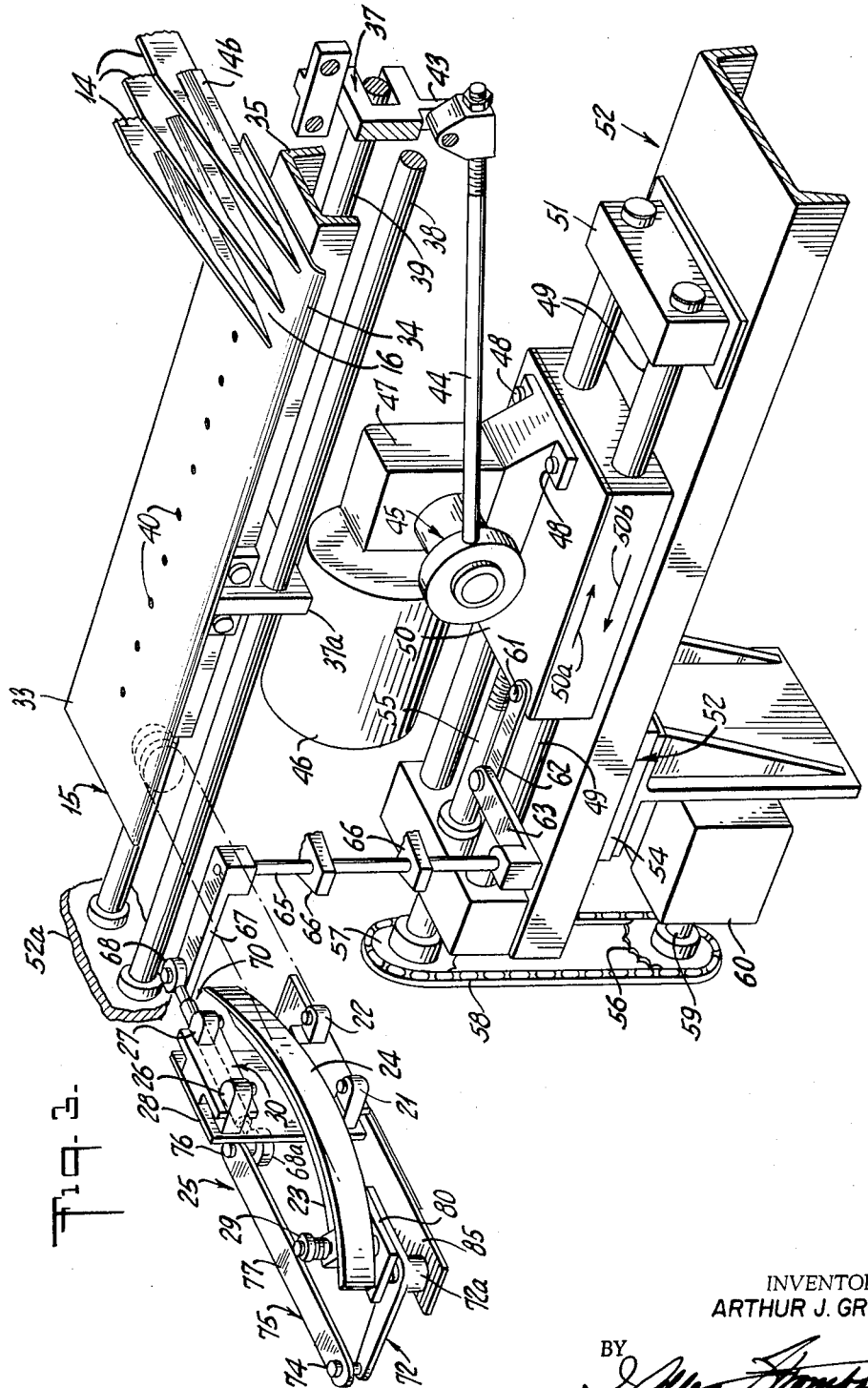
INVENTOR.
ARTHUR J. GRINER
BY
PATENT AG'T.

March 15, 1966    A. J. GRINER    3,240,314
CONVEYOR LINE ARRANGEMENT
Filed May 19, 1964    8 Sheets-Sheet 3
Fig. 4.
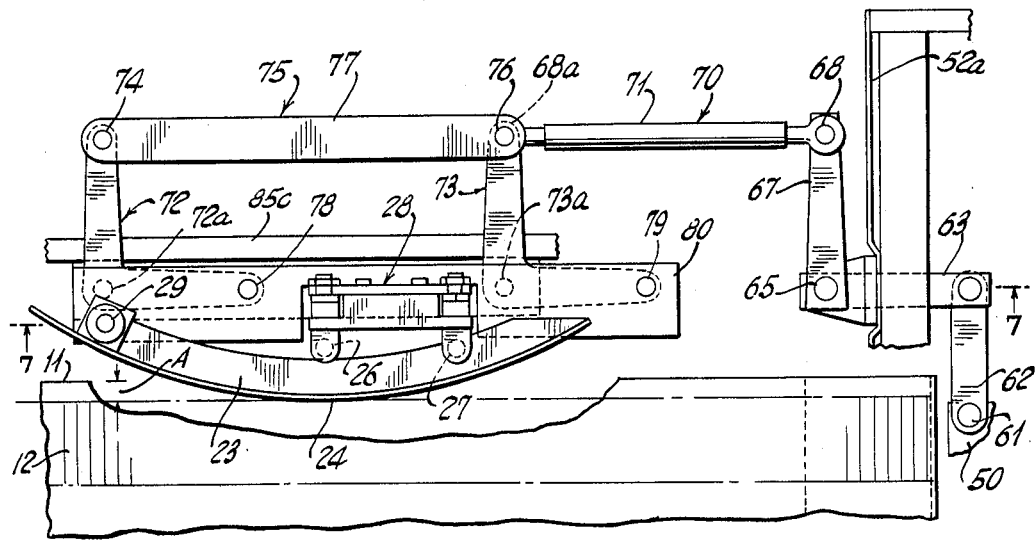
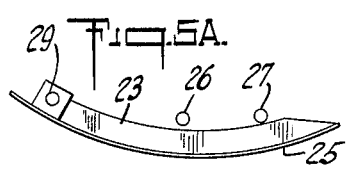
Fig. 5A.
Fig. 5.
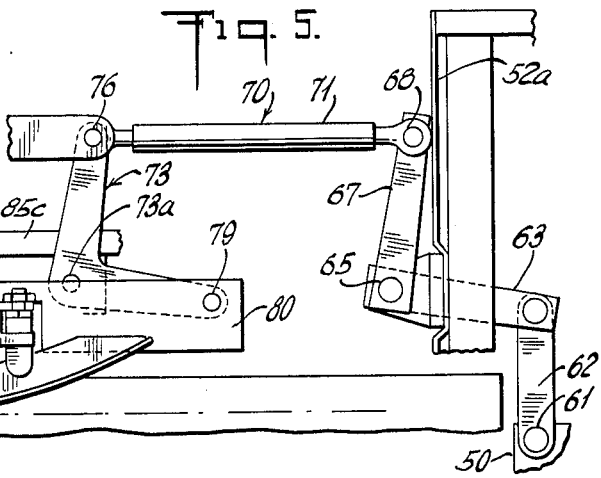
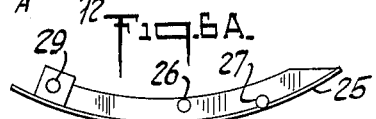
Fig. 6A.
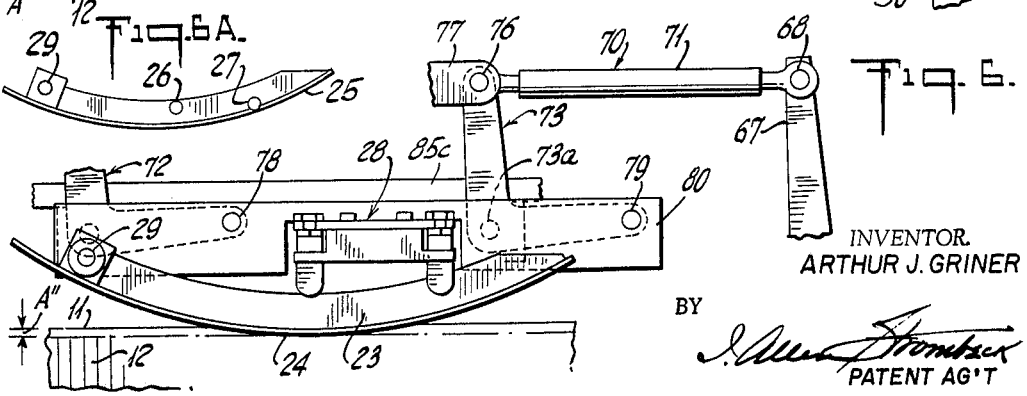
Fig. 6.
INVENTOR.
ARTHUR J. GRINER
BY
PATENT AG'T

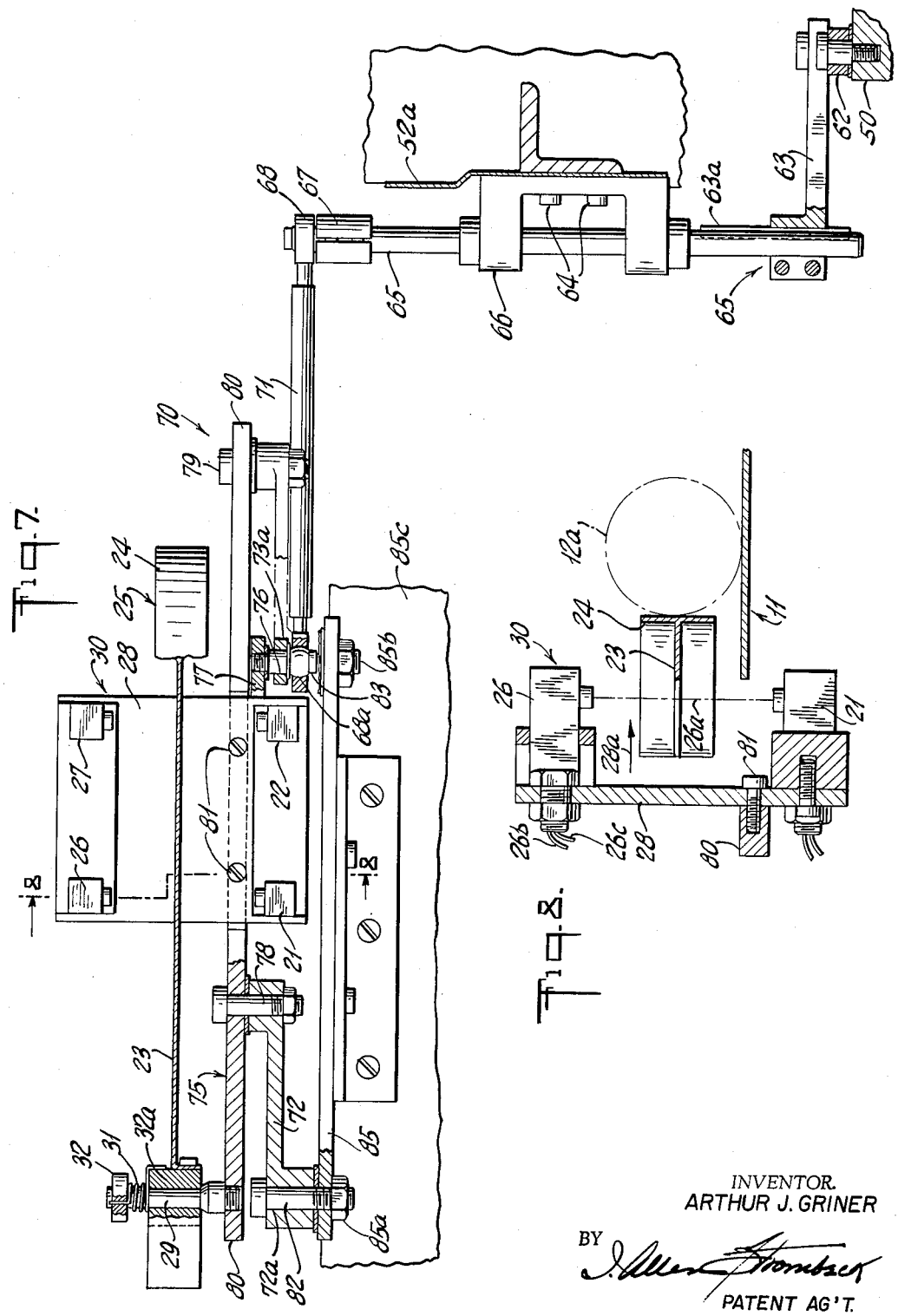

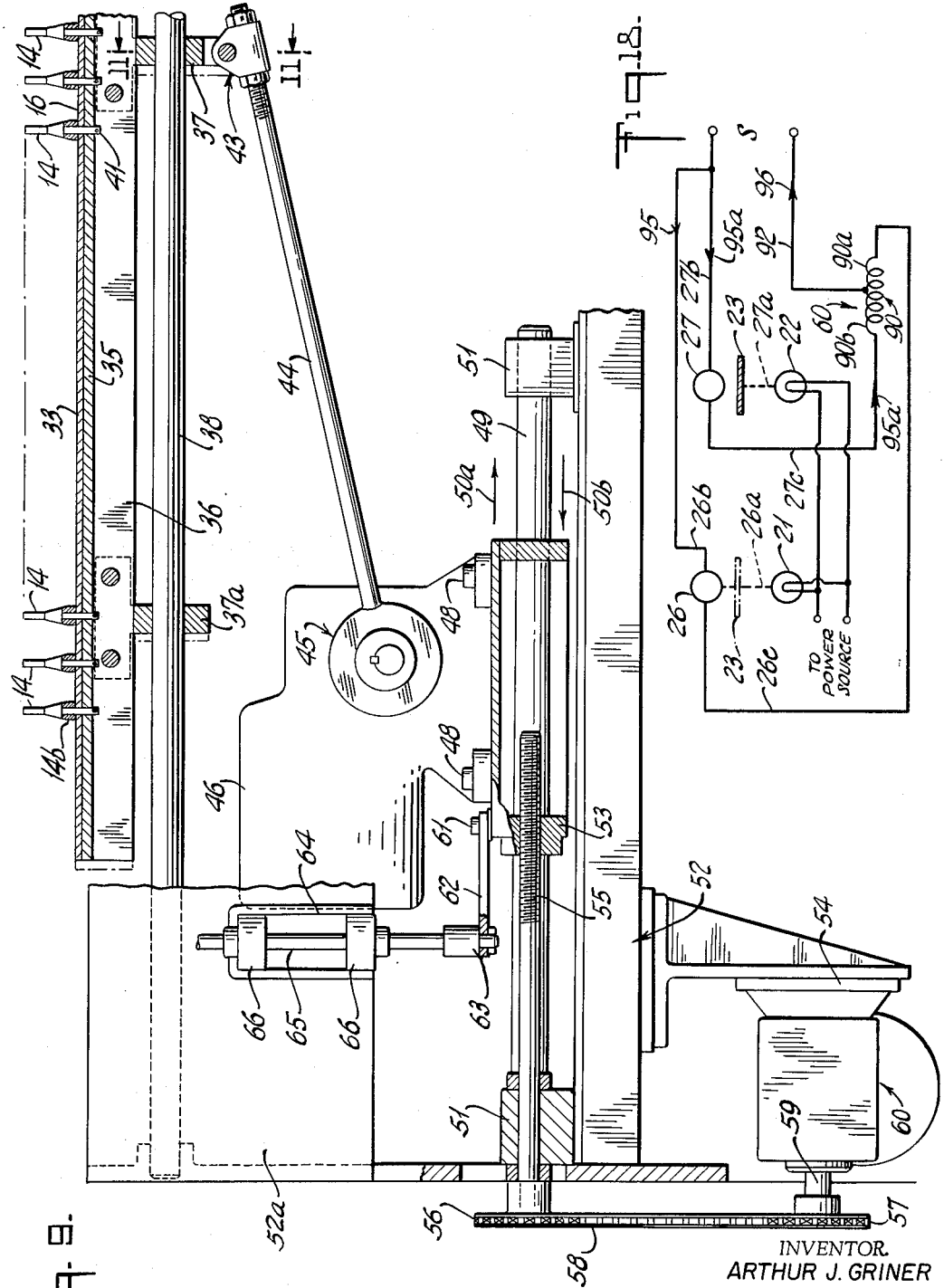
INVENTOR.
ARTHUR J. GRINER
BY
PATENT AG'T.

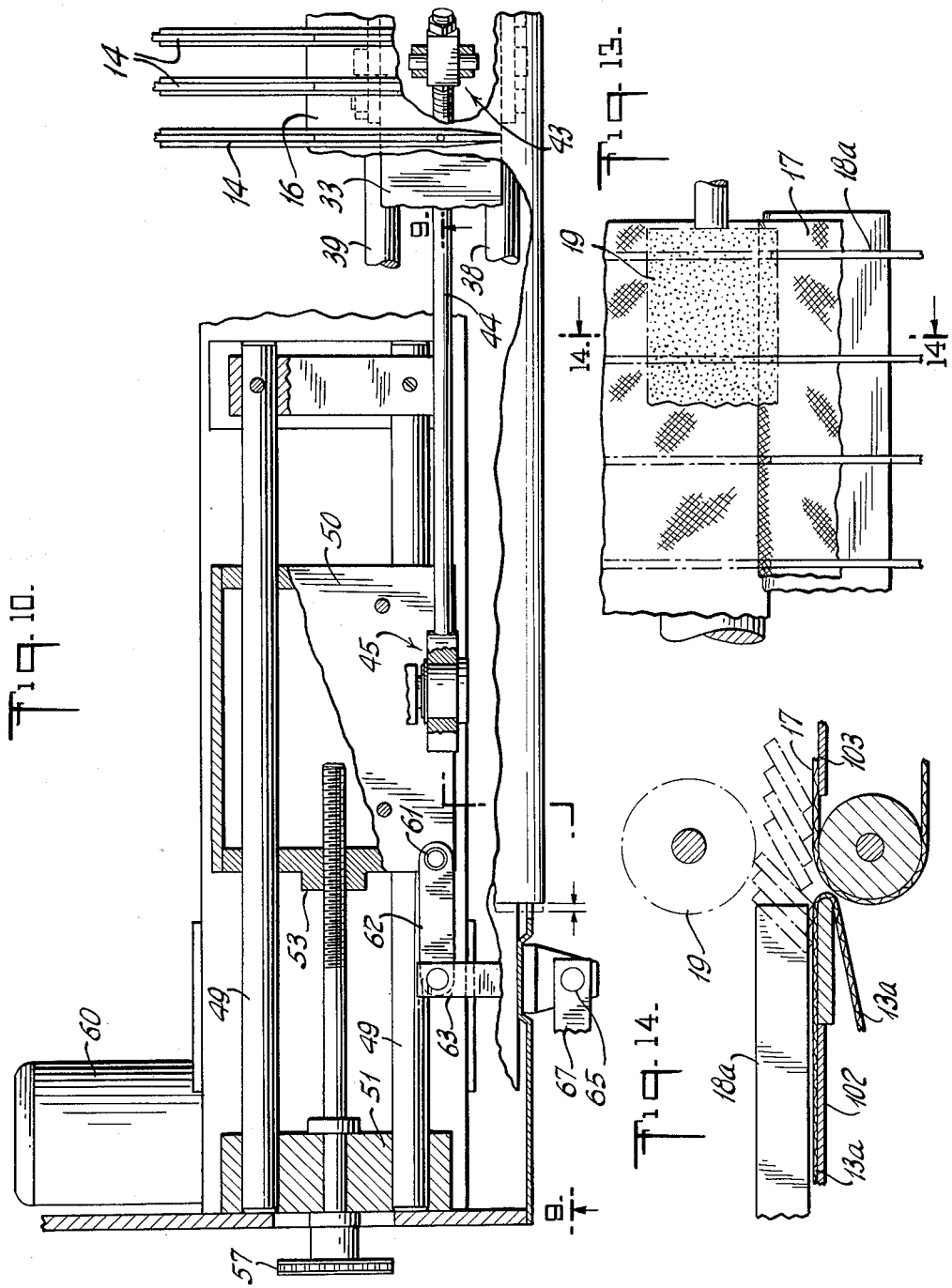

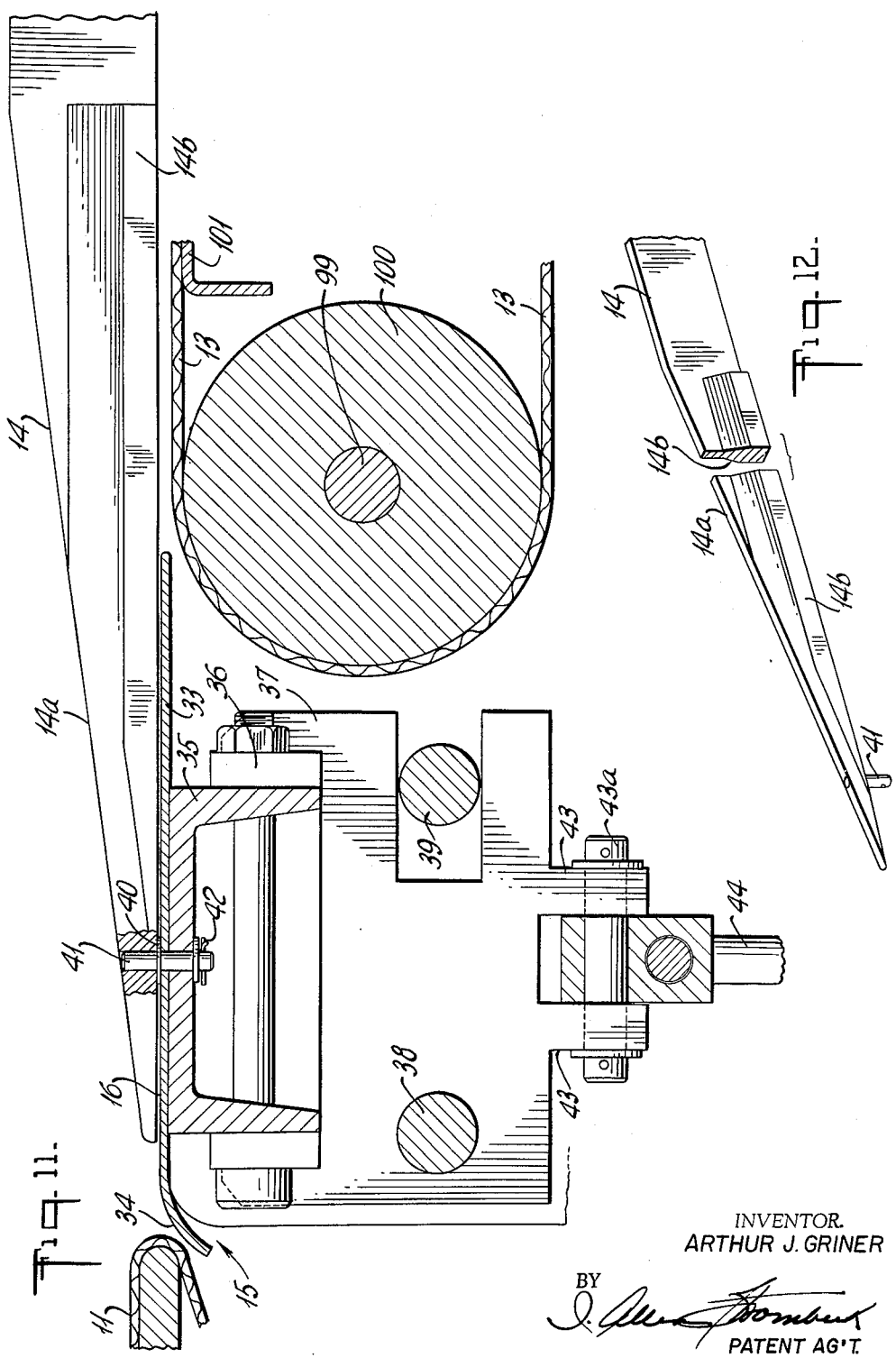

March 15, 1966 A. J. GRINER 3,240,314
CONVEYOR LINE ARRANGEMENT
Filed May 19, 1964 8 Sheets-Sheet 8
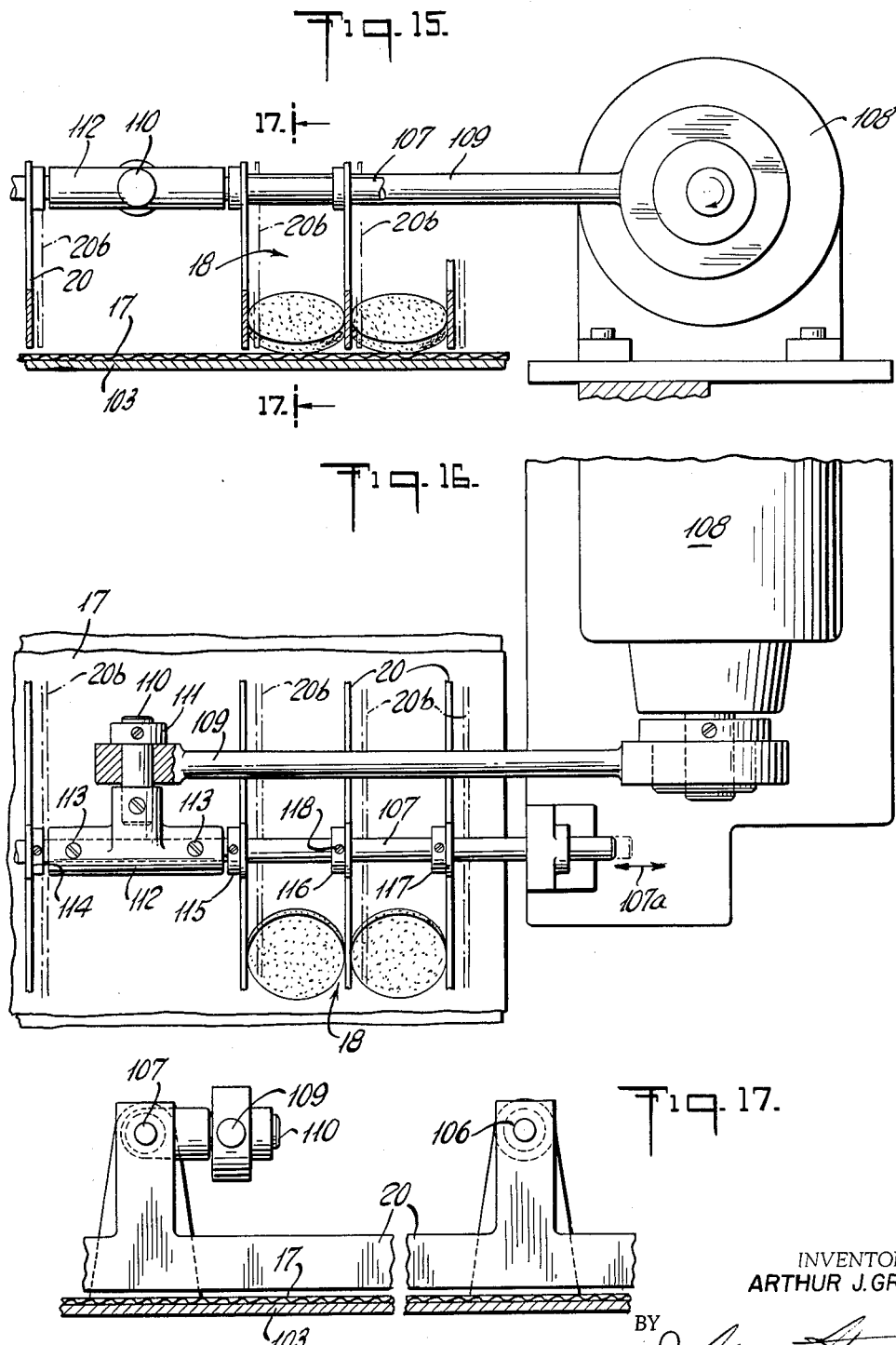
INVENTOR.
ARTHUR J. GRINER
BY
PATENT AG'T.

United States Patent Office 3,240,314
Patented Mar. 15, 1966

3,240,314
CONVEYOR LINE ARRANGEMENT
Arthur J. Griner, Wyckoff, N.J., assignor to National Biscuit Company, a corporation of New Jersey
Filed May 19, 1964, Ser. No. 368,483
17 Claims. (Cl. 198—30)

This invention relates generally to a conveyer line arrangement for moving rows or columns of substantially flat articles round or polygonal in configuration and in stacked formation to spacing, packaging and like apparatus for further handling.

It is one of the important objects of the invention to provide means affording substantially uniform, rapid and automatic positioning and conditioning of rows of articles of the aforesaid type on conveyor means preparatory to final individual disposition thereof for packaging and similar purposes.

It is another object of the invention to provide means facilitating uninterrupted conveyance of substantially flat and preferably circular-shaped articles along predetermined paths, in the course of which the said articles, such as cookies, crackers and like bakery or similarly shaped products are moved from a stacked and initially shingled position to a differently and forwardly tilted position, in which these articles assume inclined or overlapping relationship to each other for subsequent stages of treatment.

Still another object of the invention resides in the provision of means conductive to easy and convenient sensing and orienting one or more rows or columns of stacked articles of the aforesaid type for aligning and presenting them with respect to predetermined conveyor paths, so as to continuously guide and positively control such article rows along said paths.

It is yet another object of the invention to provide means resulting in a highly efficacious regulation of shingled formation and also of the movement of the aforesaid articles relative to each other, as well as to and along a plurality of successive transporting devices having various functions, to which such articles are exposed in the course of the operation of said devices.

It is still a further object of the invention to provide means effectuating at predetermined locations of the conveyer line arrangement vibratory influences to transported articles, in order to bring about their alignment and simultaneously to make the stack of articles less dense for a preset mode of spreading or shingling operation without injuring or marring said articles, in particular, if they consist of cookies or crackers made from easily frangible material or substance.

Yet another object of this invention is to provide means leading to a novel process which includes highly economical and effective successive treatment stages for stacked rows of articles, such as circular-shaped cookies or crackers with smooth or scalloped edge, whereby in the course of their passage along the novel conveyor line arrangement the articles are subjected to influences of sensing, guiding and vibratory means thereby to orient said articles to assume a preselected shingle formation for their ensuing individual handling, e.g., on vacuum spacing and loader devices.

Still another object of the invention resides in the provision of means resulting in a process of automatically imparting to rows of shingled articles gradually decreased inclination along conveyer belt means, whereby the initial inclination of about 60° to 45° reaches finally less than 30°, so that articles of optimal shingled formation (with an angle of about 15°) will be presented to subsequent treatment, e.g., to vacuum spacing means, which generally require change in speed for complying with operational conditions of loader means, whereby always a single article is fed at a time and not two or more or none from inadequately shingled article formations.

It is still a further object of the invention to provide means conducive to a continuous process of transforming rows of articles of the aforesaid characteristics from one shingled condition to another, of employing sensing means (electrical or mechanical or combination of electro-mechanical means) to accurately direct said rows of articles from straight conveyer means to diverging conveyer means and vice versa and also if desired, of subjecting said rows of articles to vibration and brush actuation during such process stages.

Other objects, features and advantages of the present invention will be readily apparent from the following detailed description of an embodiment thereof taken in conjunction with the accompanying drawings in which:

In the drawings:

FIGURE 1 is a schematic top plan view of the conveyer line arrangement pursuant to the invention, certain parts being broken away.

FIGURE 2 is a schematic side elevational view of the conveyer arrangement of FIGURE 1, parts thereof being broken away.

FIGURE 3 is a diagrammatic and perspective view of assembled parts of the article sensing instrumentality (parts being broken away) and vibration producing means associated with displaceable guide means, as viewed along lines 3—3 of FIGURE 1.

FIGURES 4, 5 and 6 illustrate somewhat diagrammatically different operative positions of the feeler arm of the sensing instrumentality and associated adjusting mechanism thereof.

FIGURES 5a and 6a indicate diagrammatically two positions of an operative part of the sensing instrumentality relative to photoelectric cell means employable in the invention.

FIGURE 7 is a partial section of the sensing instrumentality and adjusting mechanism connected therewith, the view being taken along lines 7—7 of FIGURE 4.

FIGURE 8 is an enlarged sectional view of a portion of the sensing instrumentality taken along lines 8—8 of FIGURE 7.

FIGURE 9 shows on an enlarged scale an elevational view of the guide means and of the first vibratory mechanism connected therewith, parts being shown in section, as viewed along lines 9—9 of FIGURE 10.

FIGURE 10 is a fragmentary top plan view of the displaceable guide means seen in FIGURE 9 with parts in section or broken off.

FIGURE 11 is a sectional view drawn to an enlarged scale, the section being taken along lines 11—11 of FIGURE 9.

FIGURE 12 is a fragmentary and perspective view of one of the guide blades, partly in section.

FIGURE 13 is a fragmentary to plan view of a brush arrangement seen in FIGURE 1, to which reference is made in the specification.

FIGURE 14 is a sectional view taken along lines 14—14 of FIGURE 13.

FIGURE 15 is a fragmentary elevational view of a second vibratory mechanism with parts shown in section and as viewed along lines 15—15 of FIGURE 1.

FIGURE 16 is a top plan view of the vibratory mechanism of FIGURE 15 with parts in section.

FIGURE 17 illustrates a portion of the drive means for the second vibratory mechanism, partly in section and viewed along lines 17—17 of FIGURE 15.

FIGURE 18 is a wiring diagram employable in connection with the sensing and guide means of FIGURE 3.

Referring more specifically to the attached drawings there is disclosed in FIGURES 1 and 2 a conveyor line arrangement 10 for transporting rows of flat articles, such as bakery products in the form of cookies, crackers and the like capable of being stacked and arranged in shingle formation.

This conveyor line arrangement 10 comprises generally straight conveyor means 11 carrying spaced apart rows of stacked cookies 12 coming from an oven (not shown), diverging conveyor means 13, 13a with overlying divergent guide means 14 and a vibration transmitting connector or stationary support 15 located at the mouths or entrance ends 16 of the guide paths defined between adjacent guide blade means 14, which extend from the end of said conveyer means 11. Additional conveyer means 17 with overlying substantially parallel vibratory guide elements or blades 20, is operatively connected to conveyer means 13a and guide blade means 18. Between said guide elements 18 are formed guideways 18a. Furthermore brush means 19 are positioned above and approximately at the opposite or exit ends of guide blade means 18, and about the location where the latter are connected, e.g. by welding to the blades 20 at 20a.

This conveyer line system serves the purpose of transporting stacked articles 12 in substantially spaced rows and in forwardly inclined and overlapping formation (at first at an inclination of about 60° to 45° and thereafter about 45° to 30°) until they arrive close to the infeed for the spacing mechanism (not shown), where their inclination is further reduced to an angle of about 15° to 20° to asuume predetermined shingled formation for further individual handling as for example, set forth in assignee's copending application "Product Feeding Means," Serial No. 335,996 filed on January 6, 1964.

In order to fully automatically guide the rows of flat articles along said conveyer line arrangement and to maintain proper alignment of respective article rows 12 with respect to the mouths 16 and paths formed between adjacent guide means 14 there is disposed near the edge of conveyer means 11 sensing means 25 adapted to cooperate on the one hand with a predetermined row of articles (say, the outermost row 12a) and on the other hand with the mouths or entrance ends 16 defined by said guide means 14 as seen in FIGURES 1, 3 and 11.

In the present instance the sensing means 25 comprises a spring-biased feeler arm 24 which carries midway of its height a horizontally directed vane or control plate 23, which is adapted to coact with photoelectric control means 30 and which is so located that it can make and break respective light beams established between spaced apart lamp or light sources 21, 22 and photoelectric cell means 26, 27, as will be further explained.

The photoelectric control means 30 is mounted on a fixed bracket or panel 28, whereas feeler arm 24 with vane 23 are supported on pivot pin 29 and rotatable about the latter against the slight action of a relatively weak coil spring 31. One end of said spring is retained on pivot pin 29 by means of an adjustment ring 32 for tensioning or loosening the spring 31 as the case may be, and the other end is secured to the arm holder 32a. The action of the spring should be generally sufficient to only counterbalance the weight of the arm and frictional engagement of the latter with pivot pin 29, so that the outwardly curved surface of arm 24 is capable of slightly touching the outermost exposed edge of row 12a of the cookies and of following said row without marring or inordinately rubbing against the cookies as the row of cookies passes said arm 24 during their transport on conveyer belt 11.

In order to ensure automatic and correct alignment of the stacked rows of articles 12, which assume shingled formation and are forwardly inclined, e.g., at an angle of about 60°–45° while being transported on conveyer means 11 the aforesaid sensing or control means 25 automatically and accurately directs these rows into the mouths 16 formed between the forward ends of the aforesaid guide means 14, which they pass during the guiding stage for the ensuing treatment.

It will be seen in FIGURE 11, that between the aforesaid conveyor means 11 and 13 there is disposed the above mentioned support 15, which carries a stationary plate 33 with its downwardly curved forward end portion 34, which constitutes a transition from conveyor means 11 to plate 33 proper, and furthermore includes an inverted U-shaped transverse member 35, which is mounted at 36 on respective connector pieces 37, 37a which, in turn, are supported and are slidable on a pair of transverse rods 38, 39 in crosswise direction to the movement of the conveyer means 11, 13. In plate 33 there are provided a plurality of spaced apart holes 40 which receive anchoring pins 41 for securing by means of fasteners 42 the forward ends of guide blade means 14 to plate 33 and said transverse member 35. To downwardly directed ears or extensions 43 of connector piece 37 there is pivotally and adjustably coupled thereto at 43a connecting rod 44, which is linked in any appropriate manner to eccentric drive means 45. Eccentric means 45 receives its rotary motion from motor 46 via a train of gears in housing 47. Housing 47 and eccentric means 45 driven by motor 46 are mounted at 48 on carriage 50 (FIGURE 3), which is adapted to be moved along and carried by transverse guide rods 49. These latter guide rods 49 are supported in journal mountings 51 carried by a horizontal frame 52.

Hollow carriage 50 (FIGURE 9) has an end wall 53 forming a nut for threadedly engaging a screw or threaded spindle 55 to which rotational movement is imparted via sprocket and chain arrangement 56, 57 and 58, which, in turn, receives its drive from the shaft 59 of a reversible motor aggregate 60 with associated gear box. Motor aggregate 60 is mounted on a bracket 54 forming part of frame 52.

It ensues from the aforesaid disclosure, that carriage 50 may receive its slidable movement in either direction of arrows 50a or 50b by the driven reversible motor 60 via transmitting means 56–58 and spindle 55, whereby eccentric drive means 45 with motor 46 are accordingly displaced along guide rods 49, while connecting rod 44, its linked connection 43, 37, as well as the aforesaid support 15 are entrained and carried along guide rods 38, 39, which are fixed to framework 52a. As it may be realized from FIGURE 3, vibrations from eccentric means 45 will be directed crosswise to the movement of the conveyor means and imparted to support 15 and plate 33.

On top of carriage 50 there is attached at 61 a rigid bar 62 which is linked to bar 63 for imparting rotation by means of key connection 63a to vertical shaft 65, which is journaled in spaced stationary bearings 66 anchored at 64 (FIGURES 3, 7 and 9). Rotation of shaft 65 is transmitted to bar 67, which is operatively connected at 68 to a linkage arrangemnt 70, about to be explained.

As depicted in FIGURES 4 to 7 linkage 70 comprises an adjustable arm 71 which is joined at one end by means of bar 67 to shaft 65 and at the other end 68a to a parallelogram mechanism 75 consisting of two spaced apart bell cranks 72, 73 whose apices 72a, 73a are supported by and fixed to the framework 85, 85c and whose one pair of free ends 74, 76 are interconnected by bar 77 and whose other pair of free ends 78, 79 are interconnected by a tie plate 80. On this plate 80 is mounted at 81 the bracket 28 on which photoelectric control means 30 is carried.

On the machine framework 85 (FIGURE 7) there are affixed at 85a pivot pin 82 which passes through the apex 72a of bell crank 72 and at 85b pivot pin 83, which passes through apex 73a of bell crank 73.

The actuation of the aforesaid parallelogram mechanism 75 is controlled by the changeable position and direction of movement of carriage 50 via transmission means 70, whereby tie or mounting plate 80 and bar 77 are shifted in parallel to each other. Thus photoelectric cell means 26, 27 of the control system 30, which influence the rotational operation of reversible power driven motor 60, will be automatically brought up to and adjusted in position (FIGURE 4) relative to vane 23 of contacting arm 24, while the latter is continuously, but slightly touching the exposed edge of the outermost row of articles 12a located on and adjacent the longitudinal side edge of conveyor 11.

Current flow (from any suitable source) to motor 60 will be cut off (FIGURES 4 and 18), as control system 30 adapts itself via the parallelogram mechanism 75 to the changed contacting position of arm 24, which is carried by mounting plate 80, but is swingable thereto about pivot 29.

Furthermore the changeable position and direction of movement of carriage 50 actuate via connecting means 43, 44, support 15 with plate 33 which carries guide means 14. This support 15 may be correspondingly displaced via sliding connector pieces 37, 37a along guide rods 38, 39.

In this manner the alignment of the rows of articles on conveyor 11 with respect to mouths 16 defining guideways between adjacent guide means 14 will be automatically effectuated. Besides this, plate 33 receives its vibratory motion through eccentric means 45 as hereinabove explained.

FIGURES 4, 5 and 6 ilustrate three respective positions of arm 24 together with vane 23 relative to the outermost row 12a of articles, whereby an effective conveyor edge guide control is achieved, in which A, A' and A" indicate the corresponding distance or spacing of the contacted edge of the outermost row 12a of articles from the adjacent longitudinal side edge of conveyor 11. FIGURE 5a schematically shows a first relative position of the photoelectric cell means 26, 27 and vane 23, whereas FIGURE 6a schematically elicits a second relative position thereof for bringing about closing the circuit for rotation of shaft 59 of the reversible motor aggregate 60 in the one or opposite direction as hereinafter explained.

Reverting to FIGURE 18, there is shown the operational control for reversible motor 60 with its centrally tapped winding 90. The wiring diagram in its simplified form indicates that if the light beam 26a to photoelectric cell 26 is interrupted by a selected position of vane 23 (shown in full lines) the circuit which includes this cell 26 and the conduits 26b and 26c, is closed and permits passage of the current from the source S to the right side 90a of motor winding 90 via leads 91, 92 according to arrows 95, 96. If however, the light beam 27a is not blocked and is established to photoelectric cell 27 by displacement of vane 23 (shown in dotted lines) a circuit is closed, which directs flow of current to the left side 90b of motor winding 90 via source S and through leads 27b, 27c of the photoelectric cell according to arrows 95a, 96.

Thus shaft of motor 60 will carry out left-hand or right-hand rotational movement, as the case may be, for the subsequent adjustment condition of support 15 relative to the rows of articles 12, whose outermost row 12a is slightly in touch by contacting or feeler arm 24.

As soon as control system 30 on plate 80 has then moved up to the newly adapted position of arm 24 (according to arrow 28a in FIGURE 8) its vane 23 will be located with respect to photoelectric cells 26, 27, so that in this resultant position of vane 23 the latter will permit the establishment of the light beam betwen lamp 21 and photoelectric cell 26 on the one hand and the interruption of the light beam between lamp 22 and photoelectric cell 27 on the other hand. In such newly adapted position the reversible motor 60 will be cut off from its current supply and comes to a complete standstill (FIGURE 4), so that no further motion of adjustment may occur between the mouths 16 of adjacent guide means 14 and the aligned rows of articles 12 on conveyer means 11.

When it is desired to transfer the rows of articles 12 from first conveyer means 11 onto second conveyer means 13, which latter is trained over idler wheel 100 seated and supported on spindle 99 the heretofore already shingled articles (about 50° to 60° angle) will be retarded and dragged on stationary plate 33, so that the articles will straighten up to a certain extent and form approximately a slightly larger angle of about 70° to 75° thereon. As transverse vibrations will be continuously imparted (from eccentric means 45) to plate 33 of support 15 and hence transmitted from said plate 33 to the rows of stacked articles moving thereon, the latter will be completely freed from any misalignment and will avoid any interlock between articles of adjacent rows. The rows of articles will then be pushed into the respective mouths 16 and guided along adjacent divergent guide means 14 onto driven conveyer means 13 (FIGURE 11).

It will be observed that each guide blade 14 has a forwardly slanting portion 14a reinforced and stiffened by profiled side pieces 14b, which are so located that they afford adequate positioning and fixation on plate 33 without interfering with the aforesaid articles (may they be roundish, oval or otherwise polygonally shaped), when the latter move lengthwise of and between said guide means (FIGURE 9).

While the rows of articles 12 pass the entrance ends or mouths 16 of the passageways between adjacent guide means 14 they move by means of straight conveyers 13, 13a which are supported on plates 101, 102, at preadjusted speed along diverging guide means 14 directed at predetermined angles to each other in such a manner, that any substantial sideward sliding action of the shingled article rows is minimized for all practical purposes. When these rows of articles finally leave the ends of the diverging guide means 14, they follow thereafter relative straight guideways 18a formed by prolonged stationary straight and parallel guide blade means 18 above conveyer 13a.

The ends of these straight and sufficiently spaced apart guide blade means 18 are operatively connected to or joined, as by welding at 20a, to corresponding sets of spaced apart straight guide blade means 20, which are suspended from spaced stationary rods 105 and 106. A median rod element 107, which likewise supports these blades 20, is constructed to transfer to the latter a reciprocable vibratory motion by means hereinafter explained. During this vibratory motion of blades 20 stationary rods 105 and 106 form fulcrums between which crosswise directed oscillations of the intermediate portions of blades 20 are carried out. Thus any existing tightness and compactness of the stacked articles 12 of the respective rows will be obviated and loosening up of the articles takes place.

Oscillations may be transmitted to blades 20 by a motor 108 which drives a connecting rod 109. Rod 109 is coupled at 111 to a pin or stub 110 which is connected as by means of screw bolts 113 through sleeve member 112 or the like to rod 107. As clearly depicted in FIGURES 15 and 16 blades 20 may be subjected to slight displacement action to take up positions indicated by reference numeral 20b. These to and fro movements (indicated by numeral 107a) of rod or shaft 107 are transmitted via sleeve member 112 to confronting blade securing rings 114, 115. The remaining blade holding or securing rings 116, 117 are coupled at 118 with shaft 107, from which further guide blades 20 are suspended which are also subjected to said to and fro movements (FIGURE 17).

The rows of articles are further guided from conveyor means 17, which is supported on plate 103, onto bands of infeed conveyor 17a at a still further reduced shingle formation presenting an angle of about 20° to 15° between adjacent articles of each row.

Close to the abutting and connecting ends at 20a of the straight and parallel blades 18 and 20 there is disposed for rotation above guide blades 20 and for contact with the transported articles a brush 19. This brush 19 extends across the stationary straight guide or passageways 18a and above conveyor means 17 and as schematically indicated in FIGURE 14, serves the purpose of imparting to the upper exposed edge portions of articles 12 a speed about four times that of conveyor belt 17, so that the shingled articles of each row are urged to be forwardly inclined to form a reduced angle of about 30° or less. The bristles of the brush, which may be supported and driven in any appropriate manner, e.g., by drive 120 for conveyor 17, are preferably made of nylon or of any other suitable inert material.

The conveyor belt means 17 may be driven at two different speeds depending on the proper feed operation of the loader (not shown), so that the shingled articles may be supplied to the following infeed sections of conveyor means 17a for the vacuum spacer wheel (not shown) at a low or high speed, as required. Thus the shingled formation of the articles 12 may be influenced and regulated, so as to level out the shingle formation and to make the latter more uniform throughout the conveyor means 17 and infeed conveyor means 17a for delivery to the vacuum wheel arrangement. It is well understood that instead of a vacuum wheel and loader arrangement other treatment stages or stations, such as packaging means or the like may be disposed at the end of the new conveyor line system.

It is to be noted that the blade means mentioned herein may be made of suitable plastic material, aluminum, stainless steel and like substance. The curvature of feeler arm 24 together with vane 24 is chosen, so that any slight wavy form in the contacting edge of the row of stacked articles will not interfere with the automatic alignment control herein contemplated. The width of vane 24 may be readily modified by sliding onto the same small extension pieces (not shown) for varying the effect of coaction with the photoelectric cell means, as is well understood.

Although the invention as herein disclosed employs the interaction of mechanical with photoelectric control means for achieving automatic alignment of article rows from one conveyor to a succeeding conveyor, which is equipped with diverging guideways, it may be stated that other gauge or sensing means, such as electrically or electronically operated means known per se are contemplated for realizing the aims of this invention.

It can thus be seen that there has been disclosed in accordance with the invention a conveyor line system which results in first moving one of a plurality of adjacent rows of stacked flat articles past gauging or sensing means, then directing said rows of articles toward diverging guide means, conditioning the entrance ends between adjacent ones of said guide means in response to said sensing means to bring about alignment of said directed rows of articles with respect to said entrance ends, and simultaneously subjecting said rows of articles as they reach the respective entrance ends to vibrations for orienting said article rows with respect to said entrance ends or mouths of said guide means and for moving said article rows therealong at a rate sufficient to adjust the position of adjacent articles of each row thereby to attain for the latter a shingle formation with predetermined spread and angle. Thus further handling of said articles in ensuing operations will be greatly simplified and facilitated.

The speed ratio for the conveyers herein described may be varied in accordance with the thickness and other dimensions and the shape of boundary or circumference of the articles or type of crackers used. For instance, the first conveyor 11 may be moved at a speed of about 5–7 feet per min. whereas the speed of conveyors 13, 13a will be somewhat higher, while the speeds of conveyors 17 and 17a may be further increased.

The aforesaid detailed description of the invention has been given for clearness of understanding and no unnecessary limitations should be understood therefrom. It is to be noted, that modifications and variations may be effected without departing from the spirit and scope of the invention.

What is claimed is:

1. In a conveyor line arrangement for transporting spaced apart rows of substantially flat articles in stacked formation from one conveyor onto successive conveyor belt means; the combination of
    (a) sensing means having a movable part adapted to contact one of the article rows as they move past said sensing means on said one conveyor,
    (b) spaced apart and elongated guide means located above said conveyor belt means and having entrance ends between adjacent guide means and arranged for displacement at the entrance ends in transverse direction to said conveyor belt means and in response to changed location of said movable part of said sensing means in contact with said one row of articles,
    (c) vibratory means connected with said guide means and actuatable to impart to said rows of articles reciprocable movement in transverse direction to said conveyer belt means as the rows of articles reach the entrance ends at said guide means, and
    (d) means operatively connecting said sensing means with said entrance ends, thereby to orient said entrance ends for registry with said rows of stacked articles.

2. In a conveyer line arrangement according to claim 1,
    (a) said conveyor belt means located adjacent said entrance ends of said guide means diverging from said entrance ends lengthwise of said guide means,
    (b) said guide means being substantially conformed in shape to said conveyer belt means, and
    (c) means supporting said guide means and constructed to carry out reciprocable movements in transverse direction to said elongated guide means and, through the latter to said articles,
    (d) said operatively connecting means extending between said sensing means and said supporting means.

3. In a conveyer line arrangement according to claim 1, said sensing means including
    (a) photoelectric cell means, and
    (b) pivotally supported, spring-loaded feeler means forming said movable part for contact with said articles and including a further part cooperable with said photo-electric cell means and connected to said movable part of said sensing means.

4. In a conveyer line arrangement for transporting spaced apart rows of substantially flat articles in stacked formation from one conveyer onto successive conveyer belt means; the combination of
    (a) sensing means having a movably supported feeler arm adapted to contact an edge of a predetermined row of articles as they pass said sensing means on said one conveyer,
    (b) elongated and diverging article guide means terminating in opposite ends and extending from a location beyond said sensing means onto said conveyer belt means,
    (c) a support at one end of said guide means for facilitating displacement of the latter in transverse direction to the movement of said one conveyer and in response to the movement of the feeler arm in contact with said edge of said row of articles,
    (d) actuatable means operatively connecting said feeler arm of said sensing means with said support at said one end of said guide means,
    (e) said actuatable means including means for displacing said support in transverse direction to said guide means, and
    (f) vibratory means for imparting oscillations to said one end of said guide means via said support, thereby to further orient said row of said stacked articles for registry with the space between adjacent guide means.

5. In a conveyer line arrangement according to claim 4,
(a) said sensing means further including a reversible motor, photoelectric cell means for controlling the operation of said reversible motor, means associated with said feeler arm and adapted to operate said photoelectric cell means for said motor control,
(b) said displacing means including a carriage,
(c) and respective linkage means forming part of said actuatable means and interpositioned between said support and said carriage and operatively connecting the latter with said feeler arm.

6. In a conveyer line arrangement according to claim 4,
(a) said vibratory means including a motor driven eccentric,
(b) a carriage arranged for displacement crosswise to said conveyer belt means and supporting said motor driven eccentric, and
(c) means operatively connecting said eccentric with said support of said guide means, to displace said support and to transfer oscillations to said guide means.

7. In a conveyer line arrangement according to claim 4, including rotatable brush means extending across said conveyer belt means for contacting said articles, said brush means being located at the other end of said guide means and remote from said support.

8. A conveyer line arrangement for transporting a plurality of laterally spaced longitudinal rows of substantially flat and stacked articles in the form of cookies, crackers and like products of frangible material from one conveyer defined by a longitudinal side edge to a successive conveyer, with which are associated spaced diverging guide means having entrance ends defining guideways between said guide means; the improvement comprising, in combination,
(a) sensing means adapted to perceive a row of articles when located on said one conveyer and transported thereby past said sensing means for determining distance of said article rows with respect to the adjacent side edge of said one conveyer,
(b) laterally displaceable support means extending between said one conveyer and said successive conveyer and mounting the entrance ends of said guide means,
(c) respective means responsive to said sensing means and operatively interconnecting said sensing means with said guide means on said support means for laterally displacing the latter to align said guideways with registering article rows, and
(d) means for imparting vibratory motion crosswise to said entrance ends, thereby to further facilitate aligning of the rows of articles to each other and to said entrance ends.

9. A conveyor line arrangement for a plurality of laterally spaced, longitudinal rows of substantially flat articles in shingled formation and in the form of cookies, crackers and like products of frangible material to be transported from one conveyor to a successive conveyer, on which are superpositioned spaced apart diverging guide means having entrance ends between adjacent guide means; the improvement comprising, in combination,
(a) sensing means including a swingably supported contact arm provided with a vane and further including photoelectric cell means adapted to cooperate with said vane according to the position of said arm relative to a row of articles passing said sensing means, thereby to perceive said row of articles as to their location and alignment with respect to said one conveyer,
(b) laterally displaceable support means extending between said one conveyer and said successive conveyer and mounting the entrance ends of said guide means, (c) linkage means operatively interconnecting said sensing means with said guide means on said support means in response to the position of said arm to facilitate lateral displacement of the support means and to bring about alignment of said entrance ends of said successive conveyer with said article rows on said one conveyer, and
(d) means for imparting vibratory motion in crosswise direction to said guide means entrance ends via said support means to further aid in aligning rows of articles on said one conveyer to said entrance ends of said guide means during transportation from said one conveyer onto said successive conveyor.

10. A conveyer line arrangement for transporting a plurality of laterally spaced, longitudinal rows of substantially flat and shingled articles in the form of cookies, crackers and like products of frangible material from one conveyer to a successive conveyer, on which are superpositioned diverging guide means defining entrance ends for guideways between adjacent guide means; the improvement comprising, in combination:
(a) sensing means adapted to perceive location and alignment of one longitudinal row of articles with respect to the remaining rows of articles on said one conveyer during movement of the latter past said sensing means,
(b) laterally displaceable support means located between said one conveyer and said successive conveyer and mounting the entrance ends of said guide means which extend further to and above said successive conveyer, and
(c) respective means responsive to said sensing means and operatively interconnecting said sensing means with said support means thereby to afford automatically alignment of said entrance ends with said article rows when moved from said one conveyer to said successive conveyer.

11. A conveyer line arrangement according to claim 10, said sensing means comprising
(a) photoelectric cell means,
(b) a swingably supported arm for contacting said one row of articles on said one conveyer, and
(c) a vane carried by said contacting arm and adapted to operate said photoelectric cell means; and
(d) reversible power driven means operable by said photoelectric cell means and in depedence on the position of the arm with respect to said one article row on said one conveyer, thereby to control operation of said photoelectric cell means through said vane.

12. In a conveyer line system, in which a first and second conveyer are successively arranged to transport spaced apart rows of stacked flat articles in shingled formation and in which said first conveyer is defined by a longitudinal side edge located adjacent a predetermined edge of one of the rows of articles, and said second conveyor cooperates with longitudinal diverging guide means located thereabove and having entrance ends between adjacent guide means defining guide passageways for said rows of articles, the improvement comprising, in combination,
(a) sensing means for determining the distance between said predetermined edge of said one row of articles from said side edge of said first conveyer and including a swingably and springedly supported arm for slidingly contacting said predetermined edge,
(b) said sensing means further including a vane carried by said arm and swingable therewith,
(c) photoelectric cell means arranged for movement relative to said vane thereby to operate said cell means,
(d) motive means controlled by said photoelectric cell means,
(e) motion transmitting means operable by said motive means and including shiftable mounting means forming a carrier for said photoelectric cell means, (f) said mounting means supporting said arm, which is adapted to perform swingable movement relative to said mounting means,
(g) support means carrying said entrance ends of said guide means and arranged for lateral displacement to the same between said first and second conveyers,
(h) said motion transmitting means operatively connecting said mounting means with said support means,
(i) whereby upon contact of said swingable arm with said predetermined edge of said one row of articles on said first conveyer said vane is swung accordingly for coaction with said photoelectric cell means in such a manner, that operation of said motive means is caused to laterally displace via said motion transmitting means said support means in response to said sensing means for aligning said entrance ends with said spaced rows of stacked articles on said first conveyer, until said mounting means is shifted to take up a preselected position, in which further operation of said motive means is impeded by said photoelectric cell means through coaction thereof with said vane.

13. In a conveyer system according to claim 12, said motion transmitting means further comprising
(a) power driven vibration producing means operatively connected with said support means,
(b) said vibration producing means being a motor driven eccentric adapted to impart transversely directed vibrations to said entrance ends of said longitudinal guide means.

14. In a conveyer system according to claim 13, said motion transmitting means further including
(a) a carriage arranged for transverse sliding movement relative to said conveyers,
(b) said vibration producing means being mounted on said carriage and being operable independent from said motive means,
(c) said vibration producing means being effectively joined to said support means thereby to impart vibrations in transverse direction to said entrance ends of said guide means.

15. In a conveyer system according to claim 12,
(a) including a third conveyer with superpositioned substantially straight and parallel stationary guide means thereon,
(b) said straight and parallel stationary guide means forming prolongations of said diverging guide means, and
(c) further straight guide means having opposite ends and supported to permit transverse vibratory motions intermediate said opposite ends,
(d) said further straight guide means being connected to said stationary guide means at the respective adjacent ends of the latter.

16. In a conveyer system according to claim 15, including
(a) a fourth conveyer located underneath said further straight guide means,
(b) additional vibration producing means for imparting vibratory motions to said further straight guide means thereacross, and
(c) rotary brush means overlying said fourth conveyer and adapted to coact with articles passing along said further straight guide means adjacent a predetermined one of said opposite ends.

17. In a conveyer system according to claim 16, including
(a) rod means supporting said further straight guide means,
(b) two of said supporting rod means being stationary and fixed in position to engage said opposite ends of said further straight guide means, and
(c) movable supporting rod means for said further straight guide means and located intermediate said stationary rod means and operatively connected with said additional vibration producing means.

References Cited by the Examiner
UNITED STATES PATENTS

| | | | |
|---|---|---|---|
| 1,921,580 | 8/1933 | Paterson | 198—30 |
| 2,451,104 | 10/1948 | Lowe | 198—30 |

HUGO O. SCHULZ, *Primary Examiner.*

RICHARD E. AEGERTER, *Examiner.*